US008305435B2

(12) United States Patent  
Sato et al.

(10) Patent No.: US 8,305,435 B2  
(45) Date of Patent: Nov. 6, 2012

(54) IMAGE PROCESSING SYSTEM AND SCANNING ELECTRON MICROSCOPE

(75) Inventors: Yoshimichi Sato, Hitachi (JP); Mitsuji Ikeda, Hitachinaka (JP); Fumihiro Sasajima, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1203 days.

(21) Appl. No.: 12/053,287

(22) Filed: Mar. 21, 2008

(65) Prior Publication Data

US 2009/0295914 A1 Dec. 3, 2009

(30) Foreign Application Priority Data

Mar. 22, 2007 (JP) ................. 2007-075124

(51) Int. Cl.
| H04N 7/18 | (2006.01) |
| H04N 9/47 | (2006.01) |
| G01N 23/00 | (2006.01) |
| G21K 7/00 | (2006.01) |
| G06K 9/62 | (2006.01) |

(52) U.S. Cl. ............. 348/80; 250/311; 382/209
(58) Field of Classification Search .......... 250/311; 348/80; 382/209
See application file for complete search history.

(56) References Cited

U.S. PATENT DOCUMENTS

| 4,198,569 | A * | 4/1980 | Takayama ............ 250/492.2 |
| 4,567,364 | A | 1/1986 | Kano et al. |
| 5,754,677 | A | 5/1998 | Kawada |
| 5,911,001 | A | 6/1999 | Kawada |
| 6,667,483 | B2 * | 12/2003 | Kobaru et al. ............ 250/492.2 |
| 6,947,587 | B1 * | 9/2005 | Maeda et al. ................ 382/149 |
| 7,109,483 | B2 * | 9/2006 | Nakasuji et al. ............ 250/310 |
| 7,230,243 | B2 * | 6/2007 | Tanaka et al. ................ 250/310 |
| 7,269,287 | B2 * | 9/2007 | Shishido et al. ............. 382/207 |
| 7,274,813 | B2 * | 9/2007 | Maeda et al. ................ 382/141 |
| 7,420,168 | B2 * | 9/2008 | Mizuno et al. ............. 250/311 |
| 7,460,714 | B2 * | 12/2008 | Shishido et al. ............. 382/207 |
| 7,476,856 | B2 * | 1/2009 | Watanabe et al. ............ 250/310 |
| 7,795,581 | B2 * | 9/2010 | Nakagawa et al. ........... 250/310 |
| 2002/0130262 | A1 * | 9/2002 | Nakasuji et al. ............ 250/311 |
| 2005/0285034 | A1 * | 12/2005 | Tanaka et al. ................ 250/310 |
| 2005/0285035 | A1 * | 12/2005 | Mizuno et al. ............. 250/310 |
| 2006/0038987 | A1 * | 2/2006 | Maeda et al. ............. 356/237.5 |

(Continued)

FOREIGN PATENT DOCUMENTS

| JP | 59-112217 A | 6/1984 |
| JP | 8-171638 A | 7/1996 |
| JP | 8-180191 A | 7/1996 |
| JP | 11-257939 A | 9/1999 |

(Continued)

OTHER PUBLICATIONS

Japanese Office Action dated Aug. 30, 2011 (three (3) pages).

*Primary Examiner* — George C Neurauter
(74) *Attorney, Agent, or Firm* — Crowell & Moring LLP

(57) ABSTRACT

The present invention achieves the process of easily registering a template which is prepared for a size change in pattern matching for specifying a measurement point, and high-speed pattern matching by which adequate position accuracy can be obtained in measurement. The present invention includes means for automatically calculating the size and position of a positioning template different from a measurement point itself when the measurement point is designated, to display a template having the calculated size and position. The present invention further includes means for performing pattern matching by using all or some of a plurality of divided templates and extracting templates having a similar positional relationship to the original positional relationship.

10 Claims, 12 Drawing Sheets

U.S. PATENT DOCUMENTS

| | | | |
|---|---|---|---|
| 2008/0024601 A1* | 1/2008 | Sato et al. | 348/80 |
| 2008/0101685 A1* | 5/2008 | Maeda et al. | 382/149 |
| 2008/0203298 A1* | 8/2008 | Ishijima et al. | 250/307 |
| 2008/0210865 A1* | 9/2008 | Nakagawa et al. | 250/307 |
| 2008/0272297 A1* | 11/2008 | Mizuno et al. | 250/307 |

FOREIGN PATENT DOCUMENTS

| | | |
|---|---|---|
| JP | 2000-18920 A | 1/2000 |
| JP | 2000-28336 A | 1/2000 |
| JP | 2005-3416 A | 1/2005 |
| JP | 2006-31392 A | 2/2006 |

* cited by examiner

: Measurement point

: Division of positioning template frame

: Effective template (Emphatic display)

: Measurement point

: Division of positioning template frame (Original display)

: Division of resized positioning template frame and effective template (Emphatic display)

: Measurement point

: Division of positioning template frame

: Effective template (Emphatic display)

: Measurement point

: Matching result of positioning template

: Measurement point

: Division of positioning template frame

: Effective template (Emphatic display)
= Characteristic portion

IMAGE PROCESSING SYSTEM AND SCANNING ELECTRON MICROSCOPE

BACKGROUND OF THE INVENTION

1. Field of the Invention

The present invention relates to an image processing system and a scanning electron microscope, and more particularly, to a function of performing process monitoring in, for example, semiconductor device manufacturing.

2. Background Art

Recently, thin film patterns formed on semiconductor wafers in the manufacturing process of semiconductor devices have been more and more miniaturized and highly integrated. There is an increasing need for automation of accurate and high-speed process monitoring for checking whether these thin film patterns are formed on wafers as designed.

As an inspection apparatus for measuring fine pattern dimensions, scanning electron microscopes (critical dimension-SEM (CD-SEM)) have been conventionally used as disclosed in, for example, JP Patent Publication (Kokai) No. 59-112217A (1984), JP Patent Publication (Kokai) No. 11-257939A (1999), JP Patent Publication (Kokai) No. 2000-28336A, and JP Patent Publication (Kokai) No. 2005-3416A. When pattern dimensions at a specified position on a semiconductor wafer placed on a CD-SEM stage (sample stage) are automatically measured, positioning by pattern matching using an SEM image of a measuring object is applied. Positioning on the SEM image is necessary because a measurement point is not matched due to the reasons in the measuring object side such that pattern formation on a wafer itself is misaligned, in addition to the reasons caused by a measuring apparatus such that accuracy of positioning by moving a stage is not adequate.

However, there often occurs a problem in the positioning by pattern matching. While basically a corresponding pattern portion is to be searched in the pattern matching, the dimensions of a measuring object to be measured are supposed to be changed, which conceptually contradict each other. It is therefore important that an element by which corresponding tendency is measured in the pattern matching is different from an element which is to be changed in the measuring object. When position accuracy by the pattern matching is not adequate, proper measurement values cannot be obtained. In the worst case, there is a possibility that measurement fails by misrecognizing a completely different pattern. Especially when the size of an object of the pattern matching is changed, the problem as described above occurs notably.

Therefore, as disclosed in JP Patent Publication (Kokai) No. 2006-31392A, a method of preparing a plurality of template images having different sizes to perform pattern matching has been proposed as the method of solving the case where the size of an object of the pattern matching is changed.

SUMMARY OF THE INVENTION

However, although the method disclosed in JP Patent Publication (Kokai) No. 2006-31392A enables to lower the possibility of misrecognizing a completely different pattern, there is a problem that, when the number of prepared template images (size variation) is a few, it is not possible to deal with changes over a wide range and positioning accuracy is low even if matching succeeds, and when the number of template images is increased, the processing speed of the pattern matching is lowered. There is also a problem that, conventionally, there is no method of easily registering a template which is prepared for a size change of an object.

Under such circumstances, the present invention provides a method of easily registering a template which is prepared for a size change in pattern matching for specifying a measurement point, and also provides high-speed pattern matching, by which adequate position accuracy can be obtained in measurement.

In order to solve the problem as described above, in the present invention, a positioning template different from a measurement point itself is generated when the measurement point is designated. In measurement (length measurement), even if there is no template which matches a pattern image of a measuring object in the positioning templates, if there is a template having a similar shape to the pattern image, the template is enlarged to derive information of the measurement point.

An image processing system (for example, a scanning electron microscope (CD-SEM)) according to the present invention is an image processing system for registering a measurement point and a positioning template in a pattern image on a wafer, comprising: display means for obtaining the pattern image and displaying the pattern image on a screen; template generating means for obtaining measurement point information in the pattern image and generating a positioning template based on the measurement point information and the pattern image; and information registering means for registering the generated positioning template and the measurement point information, wherein the positioning template is used for obtaining measurement point information in a corresponding pattern image and a pattern image similar to the corresponding pattern image.

More specifically, the template generating means may automatically calculate a template having a size and a position different from those of the measurement point itself. The image processing system according to the present invention may further comprise template correcting means for correcting the generated positioning template based on an instruction input, and the position of the generated positioning template may be changed in response to an instruction from a user. When the generated positioning template is constituted by a plurality of small templates obtained by dividing a square having a basic size by a predetermined division ratio and disposed on the pattern image, the division ratio of the positioning template may be changed in response to a resizing instruction from a user.

The present invention is further described in the detailed description of the preferred embodiments with reference to the accompanying drawings.

According to the present invention, it is possible to easily register a template which is prepared for a size change in pattern matching for specifying a measurement point. It is also possible to achieve high-speed pattern matching, by which adequate position accuracy can be obtained in measurement.

DETAILED DESCRIPTION OF THE PREFERRED EMBODIMENTS

Figure 1:
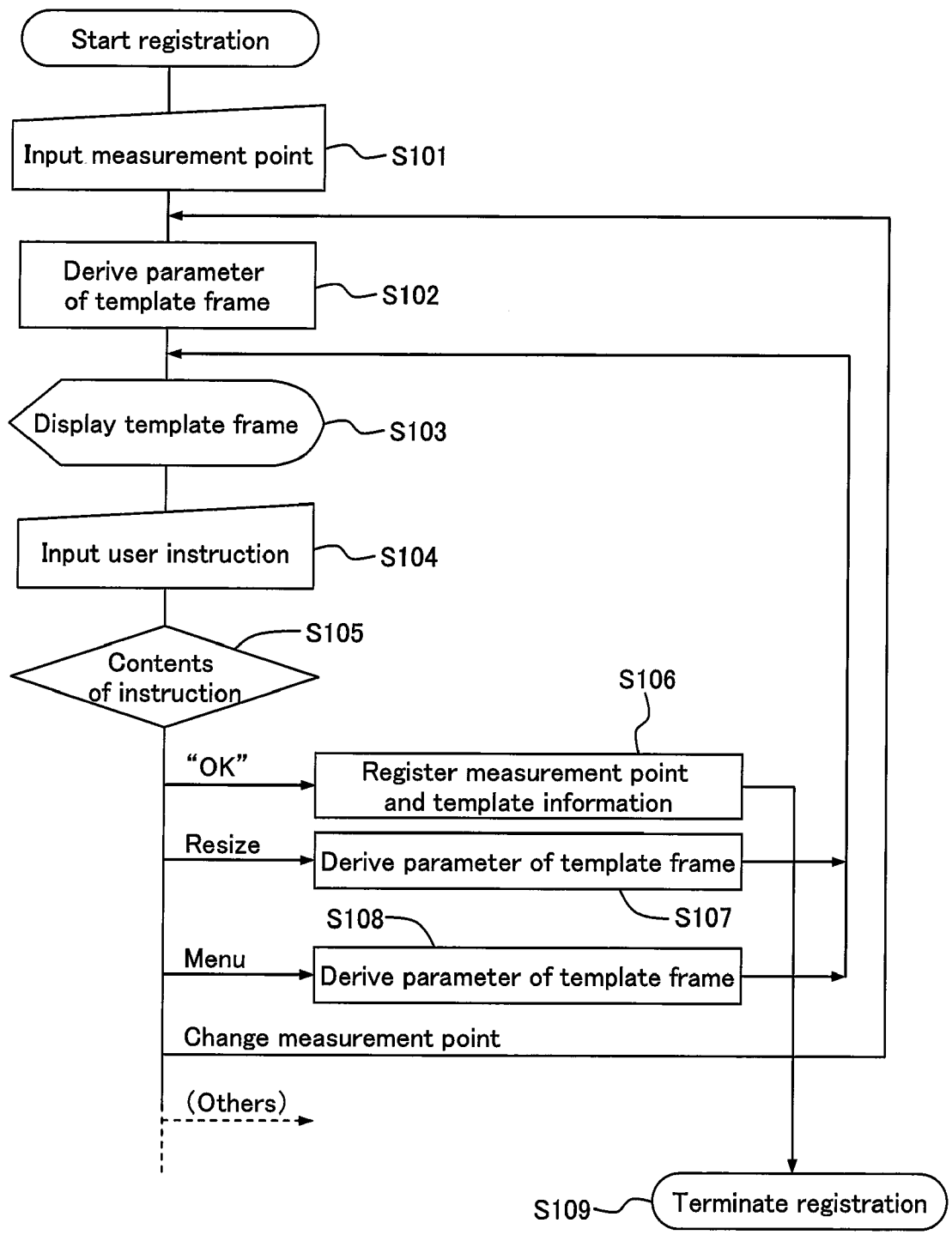
FIG. 1 is a flowchart for explaining the process of registering a measurement point and a positioning template according to a first embodiment.

Embodiments of the present invention will be described below with reference to the accompanying drawings. Note that the present embodiments are only examples for achieving the present invention and do not limit the present invention. The common constituents are denoted by the same reference numerals in each drawing.

[Configuration of Image Processing System]

Figure 13:
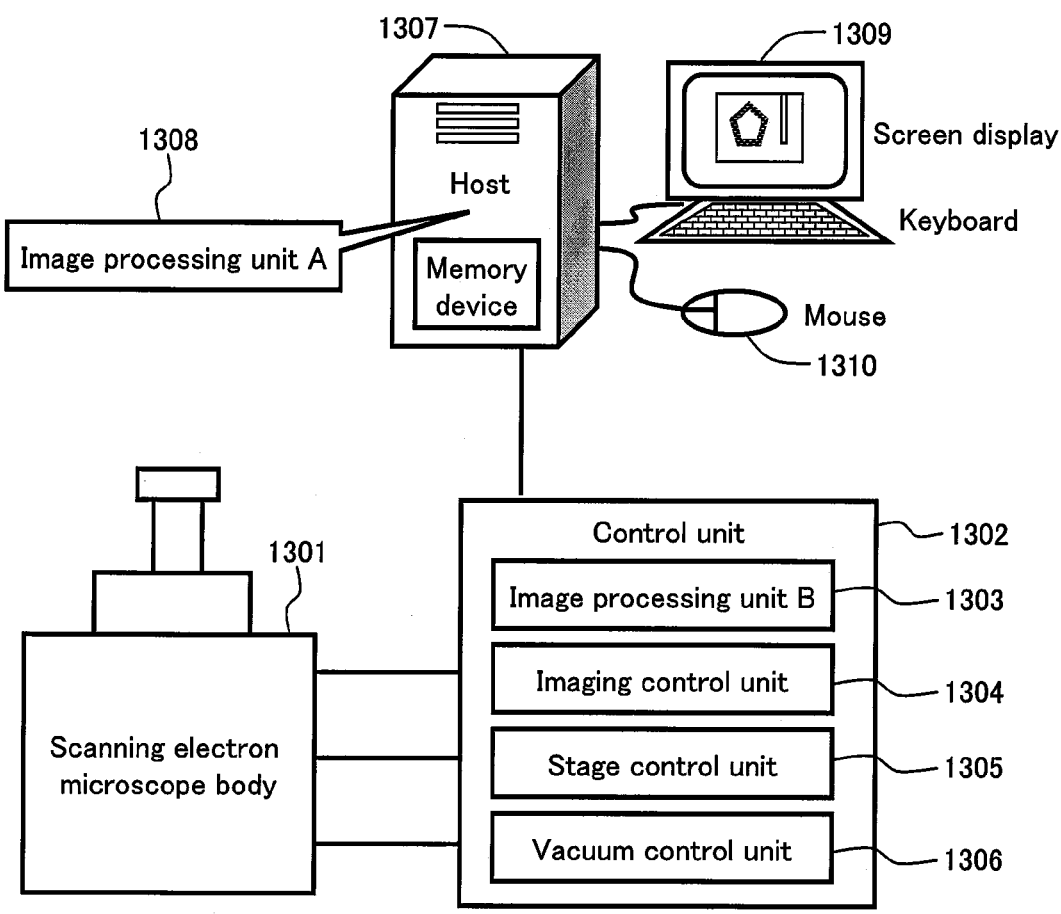
FIG. 13 is a block diagram showing an example in which the present invention is applied to a microscope.

FIG. 13 shows the schematic configuration of a scanning electron microscope (CD-SEM) used as an image processing system of the present invention. Note that an example of the image processing system is not limited to the CD-SEM and the present invention may be applied to any apparatus for performing automatic measurement based on image information, so as to simplify the positioning procedure of a measuring object to improve position accuracy of measurement. The present invention may be also applied when there is an environment for processing an image, even if not physically connected to an apparatus for obtaining an image.

In FIG. 13, the image processing system comprises a scanning electron microscope body 1301, a control unit 1302, a host (processor) 1307, an image display device 1309, and a mouse (pointing device) 1310, each of which is connected as shown in FIG. 13.

The control unit 1302 comprises an image processing unit B 1303, an imaging control unit 1304, a stage control unit 1305, and a vacuum control unit 1306.

The imaging control unit 1304 performs control for obtaining an SEM image from the scanning electron microscope body 1301. The stage control unit 1305 performs movement control of a stage in the scanning electron microscope body 1301. The vacuum control unit 1306 performs control of an exhaust vacuum pump in the scanning electron microscope body 1301. The image processing unit B 1303 inputs and processes the SEM image from the imaging control unit 1304. The host 1307 comprises an image processing unit A 1308. Although the image processing units A and B are differently provided in FIG. 13, only one of the image processing units may be provided. In the case of FIG. 13, the image processing unit A 1308 mainly performs image processing where there are many steps to be confirmed by a user, and the image processing unit B 1303 mainly performs image processing which needs to be processed continuously and rapidly. This is because transfer of image information between the control unit 1302 and the host 1307 needs some time.

For example, the process in which a user designates a measurement point and registers a positioning template as described below (see FIG. 1) is performed by the image processing unit A 1308 of the host 1307. The SEM image may be transferred from the control unit or may be stored in a memory device in the host 1307. The image is output to the image display device 1309, and a user can perform an operation on a screen by using the mouse 1310. The memory device in the host 1307 stores a program based on flowcharts shown in FIGS. 1, 7 to 9, and 11 in addition to the SEM image.

The process of determining a measurement point in an automatic measurement operation as described below (FIG. 7) is also performed by the image processing unit A 1308 of the host 1307. When the processing capacity of the host processor is low or the image transfer rate from the control unit is slow, the process may be performed by the image processing unit B 1303 as needed.

Process of Positioning Template Registration According to First Embodiment

FIG. 1 is a flowchart for explaining one example of the process of registering a measurement point and a positioning template according to a first embodiment of the present invention. Note that each process step in FIG. 1 is performed by the image processing unit A 1308 unless otherwise stated.

First, a user designates measurement points on a screen (S101). The measurement points correspond to the points from which measurement results such as shortest length, longest length and average length in a designated range can be output in a final step. Next, the step of "DERIVE PARAMETER OF TEMPLATE FRAME" is executed with respect to the input measurement point information (S102). The proper size, position, division ratio, and effective position of a positioning template are calculated from the information of the designated measurement points in this step. In other words, calculation for obtaining a template including measurement points 201 and 202 as designated in FIG. 2 (for example, a template having a square shape) is executed.

In the step of "DISPLAY TEMPLATE FRAME" (S103), a template frame and its effective positions are displayed on the screen in accordance with the size, position and division ratio of the template calculated in the step S102 (for example, see FIGS. 2 to 6). The processing stops until the user inputs an instruction in the step of "INPUT USER INSTRUCTION" (S104). Then, an input instruction is examined (S105), and each process is executed in accordance with the instruction (S106 to S108 or the like). There are many kinds of instructions from a user, but only major instructions are shown in FIG. 1.

When the user (visually) confirms that there is no problem on the designated measurement points and the displayed positioning template, the user instructs "OK". In this case, the process of "REGISTER MEASUREMENT POINT AND TEMPLATE INFORMATION" (S106) is performed, and necessary information for subsequent automatic measurement is stored and the registration process is terminated (S109). The positioning template and necessary information to be registered are stored in, for example, the memory device of the image processing system (FIG. 13).

When the size (or length and width ratio) of the displayed positioning template does not match the measurement points designated by the user, the user issues a "resizing" instruction. In particular, the resizing instruction is performed by dragging the template frame or frame corner on the screen using the mouse or the like. In this case, the process of "DERIVE PARAMETER OF TEMPLATE FRAME" (S107) is performed. The size, position, division ratio, and effective position of the positioning template are re-calculated, and a changed template frame is displayed again (S103).

Figure 5:
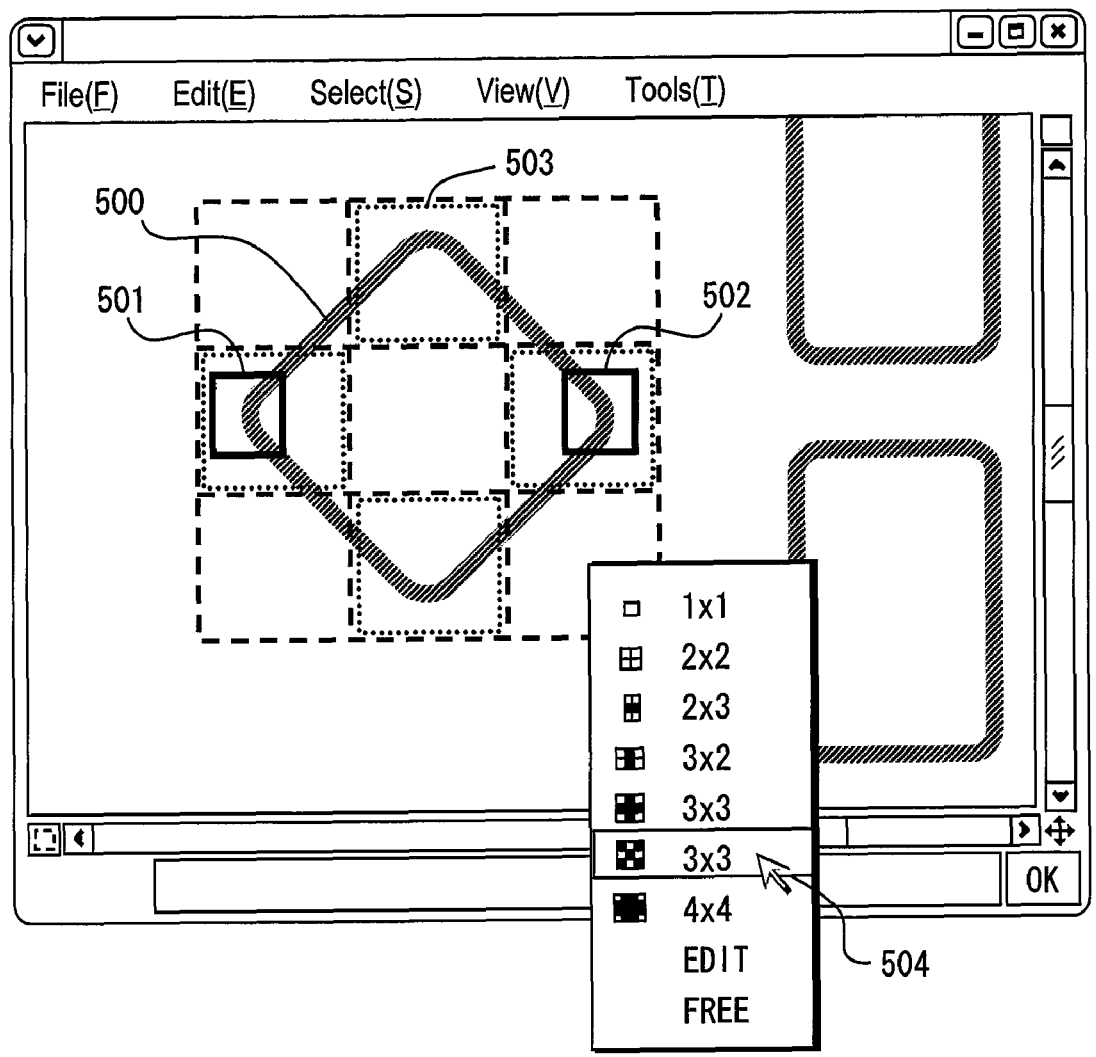
FIG. 5 is a screen showing one example of registration when one portion of an object having a special shape is measured.
Figure 5:
Figure 5:
Figure 5:
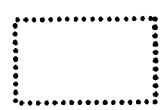

The user may also instruct to change the template from a menu (for example, see FIG. 5). In particular, the user issues the instruction of change from the menu on the screen. In this case, the process of "DERIVE PARAMETER OF TEMPLATE FRAME" (S108) is also performed (see FIGS. 5 and 6). The size, position, division ratio, and effective position of the positioning template are re-calculated, and a changed template is displayed again (S103).

There is a case in which the user changes the measurement points designated before and designates other measurement points ("CHANGE MEASUREMENT POINT). In this case, the process returns to the step S102 in which the size, position, division ratio, and effective position, including the basic position, of the positioning template are calculated.

Example (1) of Template Registration

Figure 2:
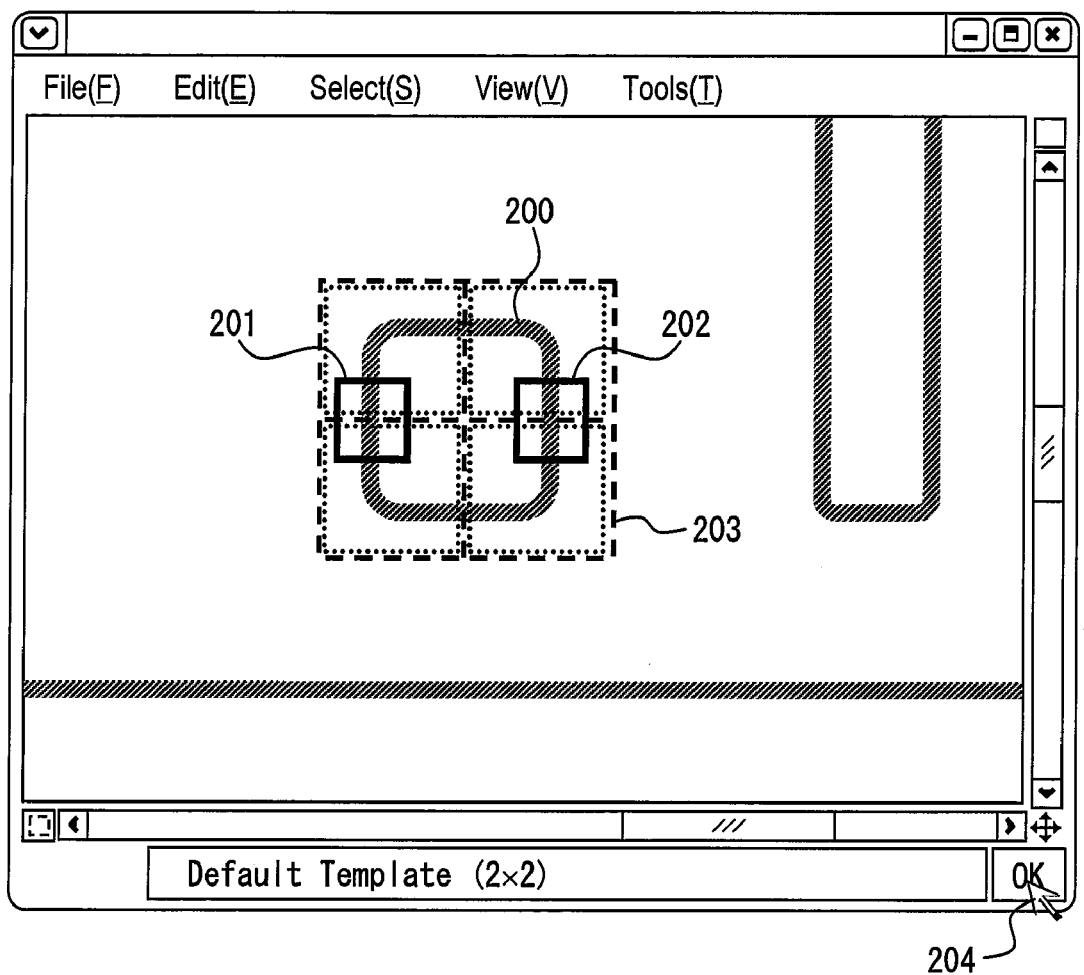
FIG. 2 is a screen showing a display result of a measurement point and a positioning template.
Figure 2:
Figure 2:
Figure 2:

FIG. 2 is a screen showing one example of a display result of a measurement point and a positioning template (which are to be registered).

In FIG. 2, a microscope image is displayed in a window of a display device. Two box-type measurement cursors 201 and 202 which indicate measurement points designated by a user and a template frame 203 which is obtained by the process of FIG. 1 are displayed on the image.

In this example, a distance between portions indicated by the two box-type measurement cursors, which is the width of the vicinity of a center portion of a measuring object pattern 200, is to be measured. A square enclosing the measurement points in its center is made to have a proper size and position. By dividing the square by 2×2, the parameter of a positioning template is calculated and displayed. This simple calculation method of template parameter is widely useful.

The measuring object pattern is appropriately included in four divided templates, and is divided to four curved portions, the characteristics of which do not change a lot even when its size is changed. The user moves an arrow cursor to an acknowledge button "OK" 204 in the lower right portion of the window and clicks the mouse, for example, to terminate the registration.

Example (2) of Template Registration

Figure 3:
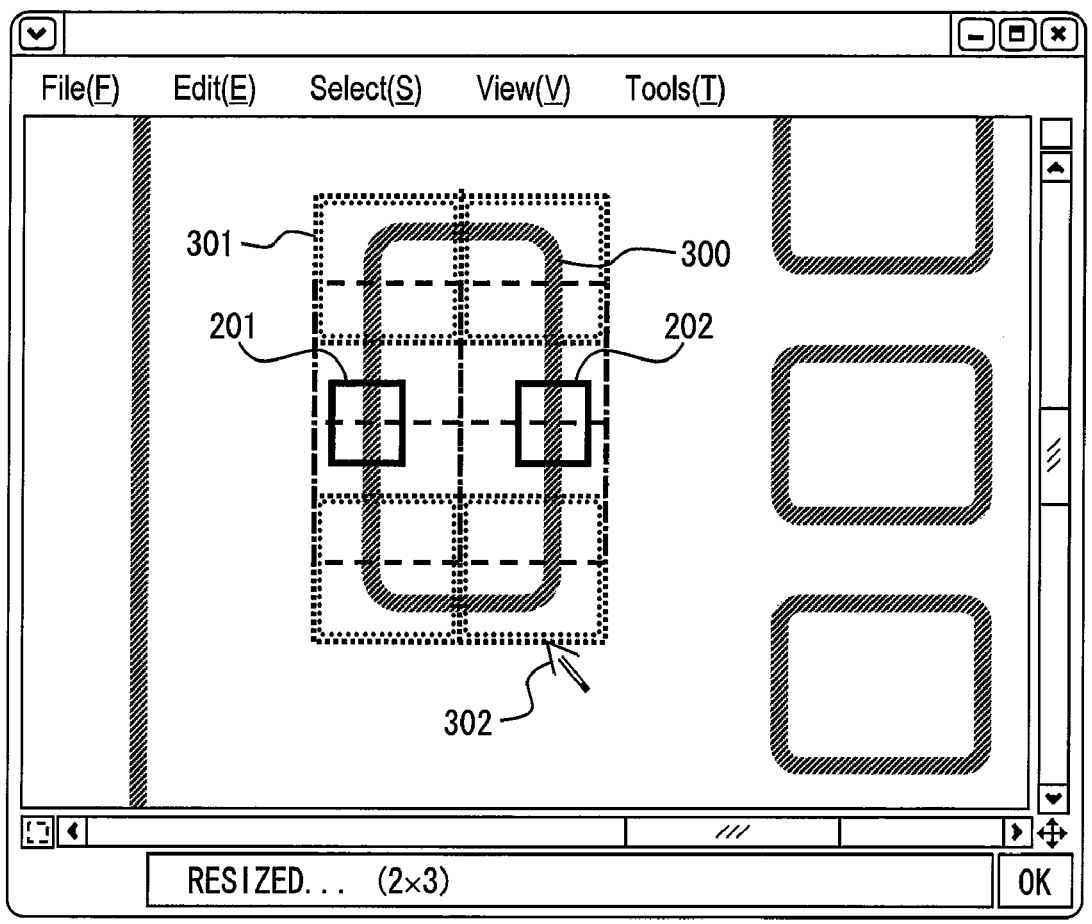
FIG. 3 is a screen showing one example of registration when one portion of a vertically-long object is measured.
Figure 3:
Figure 3:
Figure 3:

FIG. 3 is a screen showing one example of template registration when one portion of a vertically-long object pattern 300 is measured.

In FIG. 3, the template 203 having a square shape is displayed first with respect to the measurement points 201 and 202 designated by the user. However, the template having a square shape does not properly include the object pattern, and the measurement points cannot be accurately determined. Thus, the user performs a "resizing" operation. The resizing process is performed by dragging the template frame on the screen by using the mouse or the like. For example, as shown in FIG. 3, the bottom line of the template frame is dragged so as to enclose the vertically-long pattern 300 (see the reference numeral 302). By this operation, the template frame extends symmetrically in a vertical direction with respect to the box-type measurement cursors sandwiched therebetween. The division ratio is re-calculated by the process of "DERIVE PARAMETER OF TEMPLATE FRAME" (FIG. 1), and the template frame is displayed by changing the division ratio from 2×2 to 2×3 (see the reference numeral 301).

When the division ratio is 2×3, the characteristics of the measuring object are likely to be captured better by using only four of divided templates in the corners as shown in FIG. 3 than using all of the six divided templates. In this case, the four templates in the corners may be emphatically displayed as effective templates.

Example (3) of Template Registration

Figure 4:
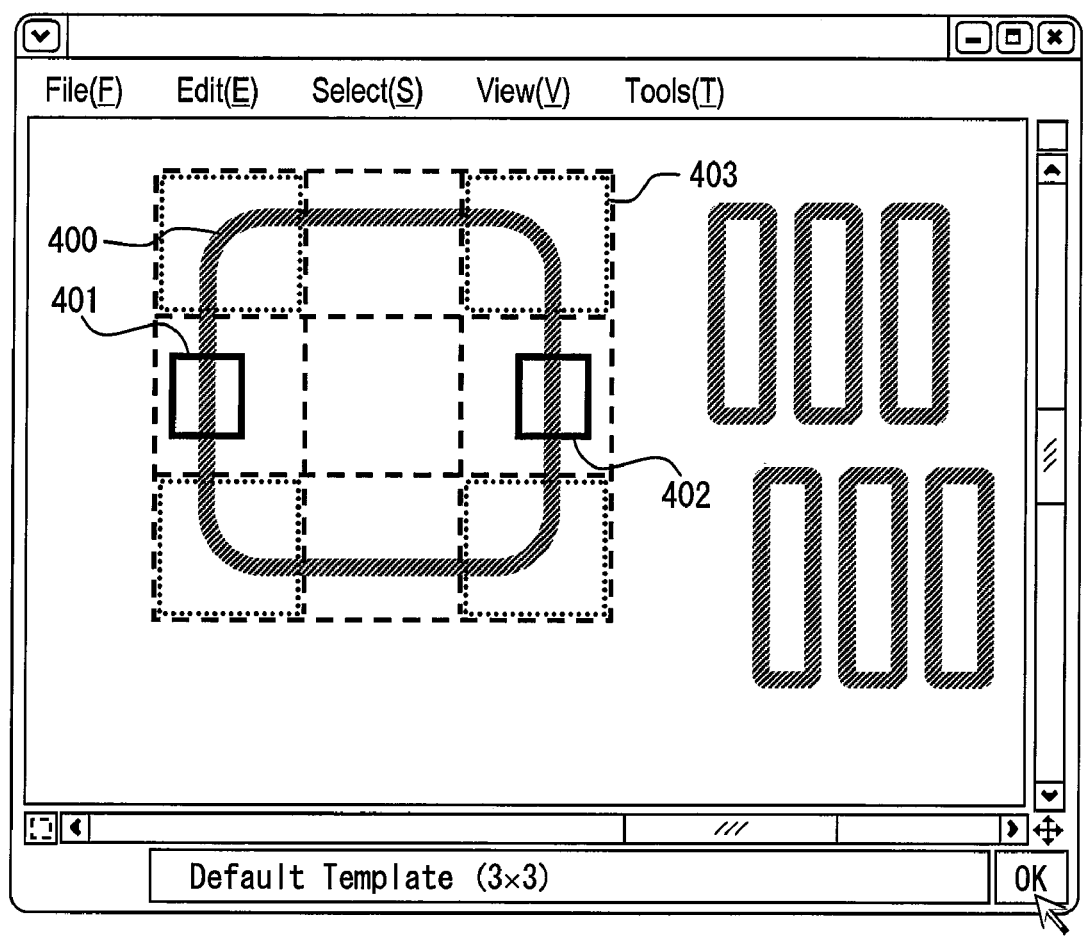
FIG. 4 is a screen showing one example of registration when one portion of a large object is measured in the screen.

FIG. 4 is a screen showing an example of template registration when one portion of a large object 400 is measured in the screen.

A template 403 having a square shape divided by 3×3 is displayed first with respect to measurement points 401 and 402 designated by a user. When the template is too big, there occurs a problem that the proportion of a characteristic component (curved portion in this example) becomes small or pattern matching needs longer processing time.

Thus, the division ratio is calculated such that the size of divided template does not exceed a predetermined size. For example, a square including measurement points is divided to four templates as the basic process. When one divided region is larger than the predetermined basic size, the division number is increased. That is to say, the division ratio is calculated such that the size of one divided region becomes smaller than the predetermined basic size.

Since it is assumed that the characteristics of the measuring object are likely to be captured better by using only four templates in the corners as in the example of FIG. 3, the four templates are also emphatically displayed as effective templates in the example of FIG. 4.

Example (4) of Template Registration

FIG. 5 is a screen showing an example of template registration when one portion of an object 500 having a special shape is measured.

In FIG. 5, curved portions of the object pattern 500 which are the characteristic portions thereof are not located in the corners of a template having a square shape in vertical and lateral directions of the screen, but are located in intermediate portions therebetween.

A template having a square shape divided by 3×3 is displayed first with respect to measurement points 501 and 502 designated by a user. It is assumed that the characteristics of the measuring object are likely to be captured better by using only four templates in the corners, and the four templates in the corners are emphatically displayed as effective templates.

However, the user instructs to change the templates from the menu by judging that the templates are not appropriate. In particular, the user performs the instruction operation 504 by right-clicking the mouse and selecting the position of effective templates from the displayed menu on the screen. The position designation of effective templates which is often used may be preset in the menu. Effective templates 503 after the changing instruction are determined, registered and displayed.

Example (5) of Template Registration

Figure 6:
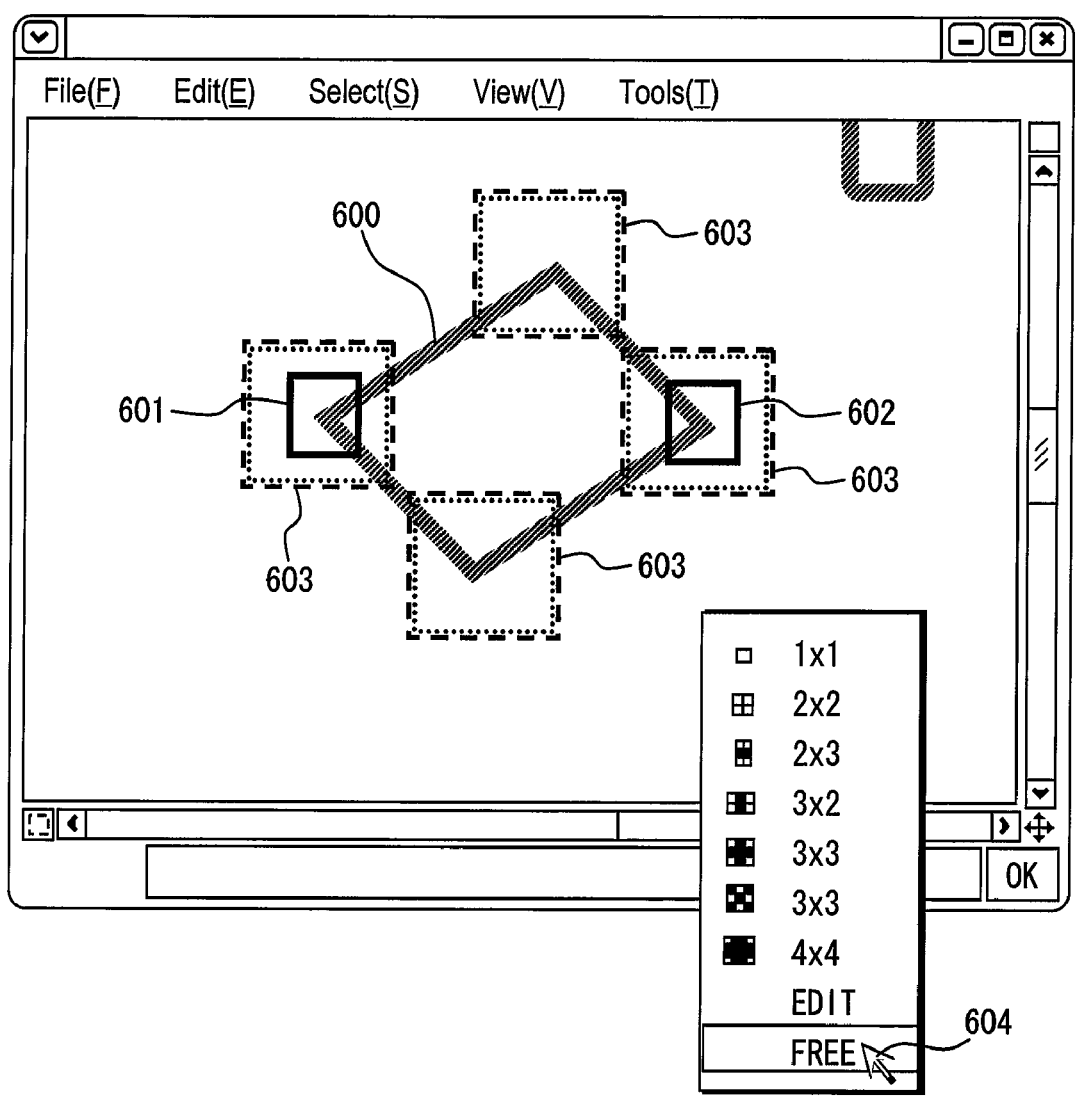
FIG. 6 is a screen showing one example of registration when one portion of an object having a very special shape is measured.

FIG. 6 is a screen showing an example of template registration when one portion of an object 600 having a very special shape is measured.

When the characteristic portions of the object pattern 600 cannot be captured well with respect to measurement points 601 and 602 designated by a user by simply dividing a rectangular template, the user selects a free format ("FREE" 604) from the menu, and designates each positioning template. Since there are many operation steps in this case, the free format is used only when needed.

FIG. 6 shows templates 603 after designating each positioning template.

[Process of Measurement Point Determination]

Figure 7:
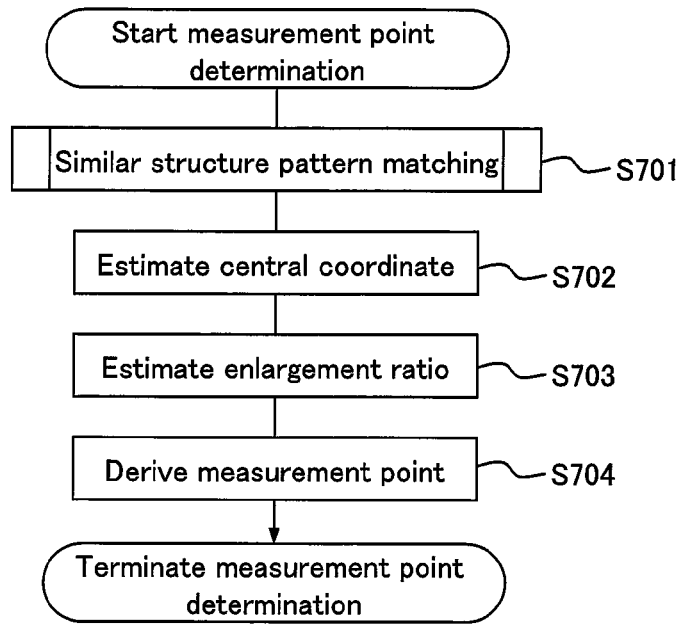
FIG. 7 is a flowchart for explaining the process of determining a measurement point.

FIG. 7 is a flowchart for explaining the process of determining a measurement point used in an automatic measurement operation. The process is also performed by the image processing unit A 1308 unless otherwise stated.

First, "SIMILAR STRUCTURE PATTERN MATCHING" (S701) is executed against an image including a measuring object by using prepared templates. The details will be described below with reference to FIG. 8.

Next, a center coordinate is estimate-calculated from coordinates of similar relationship obtained from the matching result (S702). Then, an enlargement ratio (or reduction ratio) is estimate-calculated from the coordinates of similar relationship obtained from the matching result (S703). A measurement point in consideration of the size change is derived from the estimate-calculated center coordinate and enlargement ratio (S704).

Figure 8:
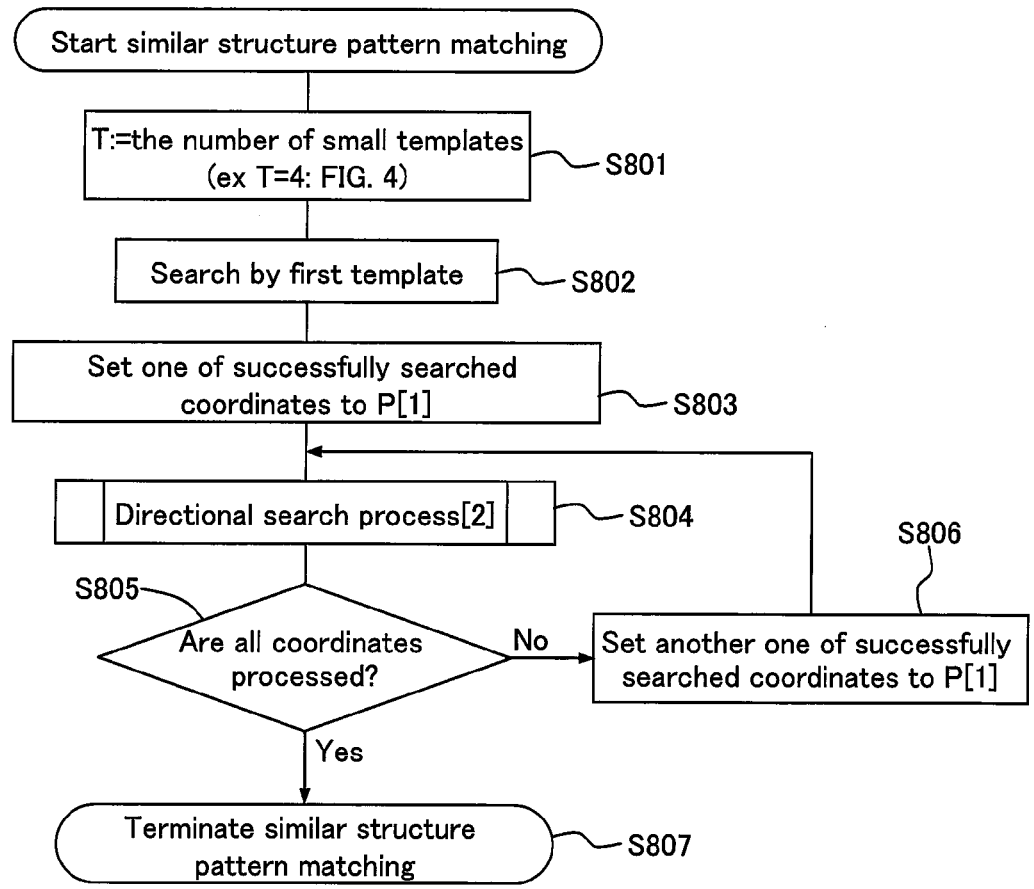
FIG. 8 is a flowchart for explaining the details of similar structure pattern matching (FIG. 7)

FIG. 8 is a flowchart for explaining the details of the process of the similar structure pattern matching (the step S701 in FIG. 7).

First, the number of prepared small templates is set to a variable number T (S801). The small templates mean effective templates after divided. For example, T=4 in FIGS. 2 and 3.

Next, a search is executed (matching with the object image) by using one of the small templates (first template) (S802). One of successfully searched coordinates (there may be a plurality of successfully searched coordinates) is set to P[1] which is one of coordinate vector variable sequences (S803).

Subsequently, "DIRECTIONAL SEARCH PROCESS" (S804) is executed by giving a parameter "N=2". The details will be described below with reference to FIG. 9.

It is then determined whether all of the successfully searched coordinates have been processed (S805). When all of the coordinates have been processed, the similar structure pattern matching is terminated (S807). When not all of the coordinates have been processed, another one of the successfully searched coordinates is set to P[1] (S806), and the steps S804 to S806 are repeated.

Figure 9:
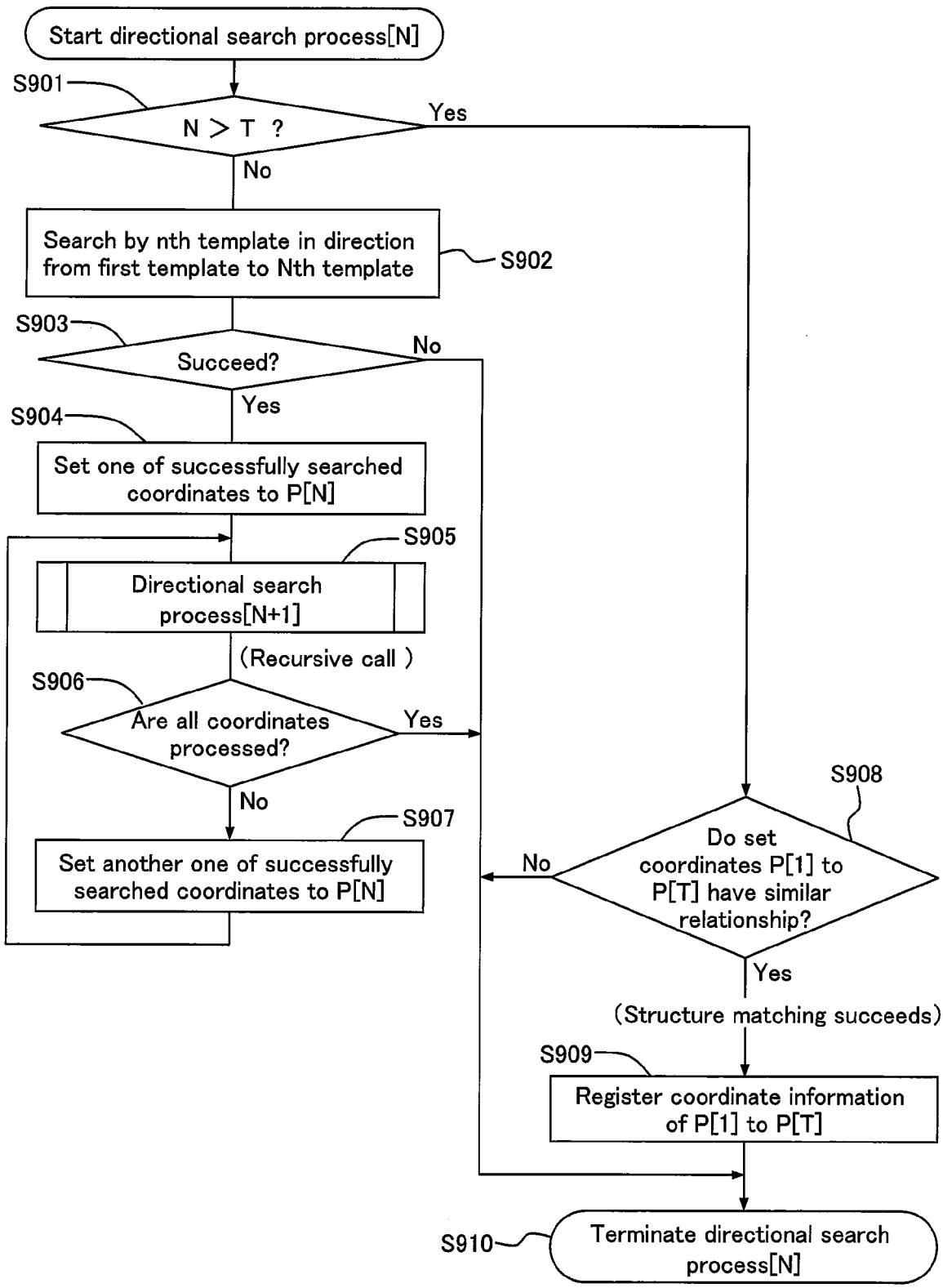
FIG. 9 is a flowchart for explaining the details of directional search process (FIG. 8)

FIG. 9 is a flowchart for explaining the details of the directional search process (the step S804 in FIG. 8).

First, in the directional search process, it is determined whether "N" as the parameter value is bigger than the value of T (S901).

When it is determined as "No" (N is not bigger than T) in the step S901, the following process will be executed. The case where N is smaller than T means that not all of the coordinates P[1] to P[T] relative to the small templates have been set.

In the step S902, the search is executed by an Nth template in a direction from the first template to the Nth template. Since N=2, the search is executed by a second template first (for example, second small template out of four small templates). The starting point of the direction is the coordinate P[1].

Next, it is determined whether the search process of the step S902 has succeeded (S903). When the search has not succeeded (no coordinate has been found), the directional search process is terminated (S910). When the search has succeeded (one or more coordinates have been found), one of the successfully searched coordinates is set to P[N] (S904).

The directional search process is subsequently executed (S905). This is a recursive call of its process, and the parameter value here is set to "N+1" to process the next template.

In the step S906, it is determined whether all of the coordinates obtained by the search in the step S902 have been processed. When all of the coordinates have been processed, the directional search process is terminated (S910). When not all of the coordinates have been processed, another one of the successfully searched coordinates is set to P[N] (S907), and the steps S905 to S907 are repeated.

When it is determined "Yes" in the step S901 (N is bigger than T), the following process will be executed. The case where N is bigger than T means that all of the coordinates P[1] to P[T] relative to the small templates have been set and matching has succeeded in a directional component.

In the step S908, it is determined whether the positions of the set coordinates P[1] to P[T] have a similar relationship to the original positions. As a result of the determination, when the positions do not have a similar relationship, the directional search process is terminated (S910). When the positions have a similar relationship, information of the coordinates P[1] to P[T] is registered and the directional search process is terminated (S909 and S910). The registered information of the coordinates P[1] to P[T] is used for estimating the center coordinate (S702) and the enlargement ratio (S703) in FIG. 7.

[Example of Positioning Process for Measurement]

Figure 10:
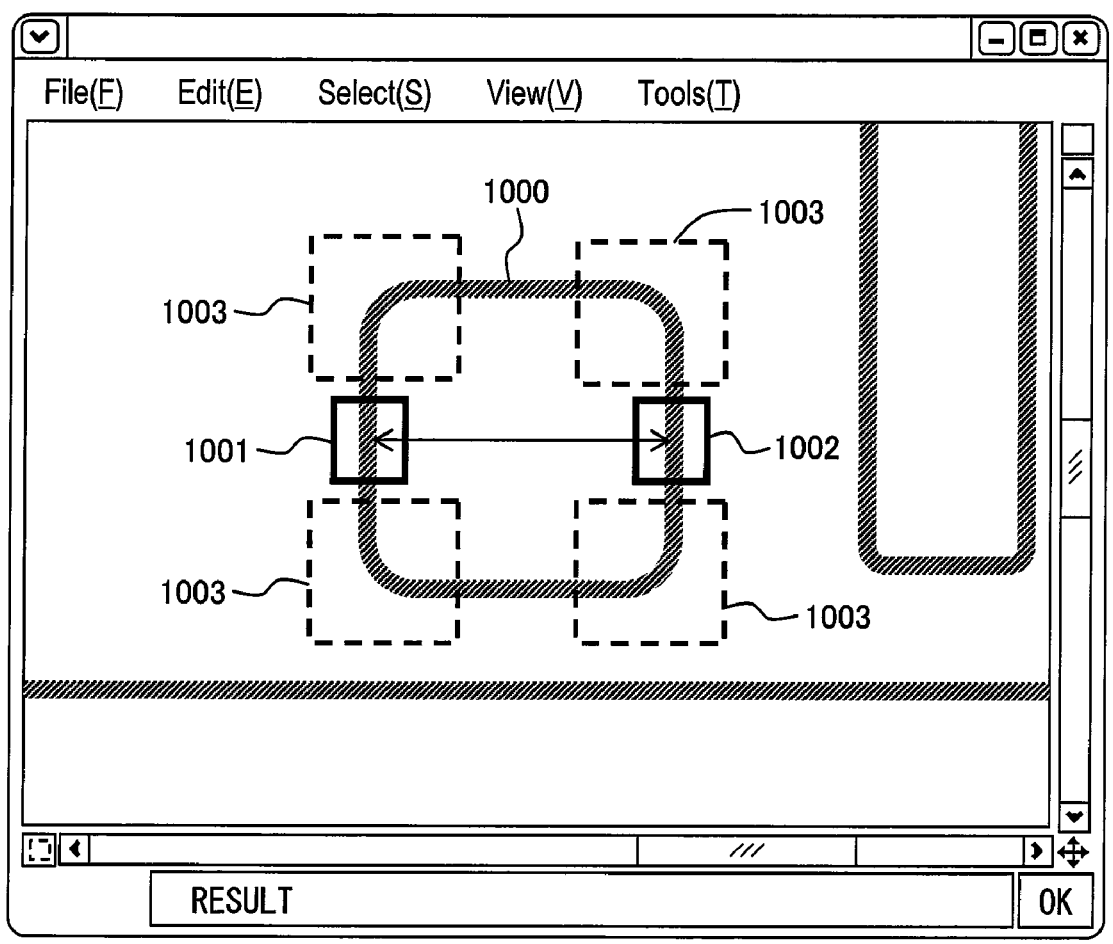
FIG. 10 is a screen showing a result of performing positioning for measurement.
Figure 10:
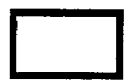
Figure 10:

FIG. 10 is a screen showing a result of performing positioning for measurement by executing the processes in FIGS. 7 to 9 on a measuring object, the size of which has been changed, based on the information registered in FIG. 2. In FIG. 10, an input is a pattern 1000 and an output is 1001 and 1002.

In FIG. 10, the magnification of the microscope has not been changed and the measuring object pattern 1000 has increased in size. When the similar structure matching is performed by using the divided templates, matching succeeds in four characteristic portions 1003, which are apart from each other, with respect to the measuring object pattern 1000 which has increased in size. By calculating the center coordinate from the four portions 1003 and calculating the amount of size change from the distance therebetween (estimating the enlargement ratio), it is possible to accurately obtain measurement points (points 1001 and 1002 on which measurement cursors are displayed).

Process of Positioning Template Registration According to Second Embodiment

In the first embodiment as described above, a template automatically prepared in the first step when a user designates measurement points is basically a square enclosing the measurement points, and four templates in the corners obtained by dividing the square are considered as effective templates.

However, it is desirable to set a template automatically prepared in the first step as appropriately as possible.

Figure 11:
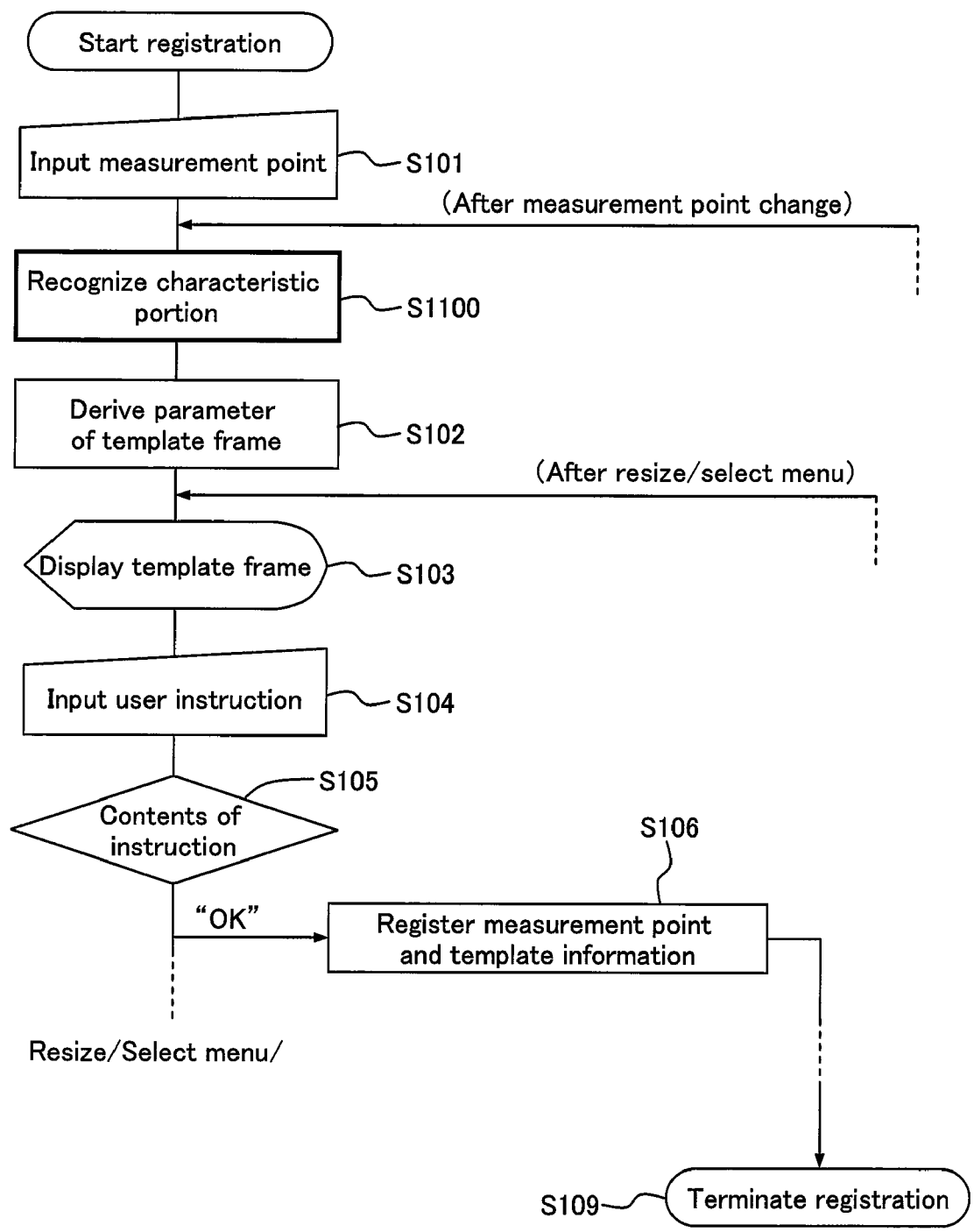
FIG. 11 is a flowchart for explaining the process of registering a measurement point and a positioning template according to a second embodiment.

Thus, as long as it is acceptable in terms of processing time, a more appropriate template is automatically prepared in the first step. FIG. 11 is a flowchart for explaining the process of registering a measurement point and a positioning template according to a second embodiment. The common steps with the first embodiment (FIG. 1) are partly omitted.

First, a user designates measurement points on a screen (S101).

Next, a portion suitable for a template is searched around a region including the measurement points in the process of "RECOGNIZE CHARACTERISTIC PORTION" (S1100).

Elements suitable for characteristics include a figure closed by a curved line, a polygon, an intersection of straight lines, a corner which is as acute as possible, or the like. Unsuitable elements include a solid region with a constant value, a simple straight line, a random region or the like. The details of the recognition of characteristic portion are disclosed in JP Patent Publication (Kokai) No. 2001-34758A, for example, and thus, the description is omitted here.

Subsequently, in "DERIVE PARAMETER OF TEMPLATE FRAME" (S102), the proper size, position, division ratio, and effective position of a positioning template are calculated based on the input information of the measurement points and the recognition result of characteristic portion. In "DISPLAY TEMPLATE FRAME" (S103), a positioning template frame and its effective positions are displayed on the screen in accordance with the calculated size, position and division ratio.

The processing stops until the user inputs an instruction in "INPUT USER INSTRUCTION" (S104). When the user (visually) confirms that there is no problem on the designated measurement points and the displayed positioning template, the user instructs "OK". In this case, the process of "REGISTER MEASUREMENT POINT AND TEMPLATE INFORMATION" (S106) is performed, and necessary information for subsequent automatic measurement is stored and the registration process is terminated.

When the displayed positioning template is not suitable for the measurement points designated by the user, the user instructs to change the template by resizing or selecting the menu. The measurement points may be also changed. The process flow of such cases is the same as in the first embodiment (FIG. 1).

Example (5) of Template Registration: Specific Example According to Second Embodiment FIG. 12 is a screen showing one example of a result of registering (displaying) a measurement point and a positioning template according to the second embodiment.

Figure 12:
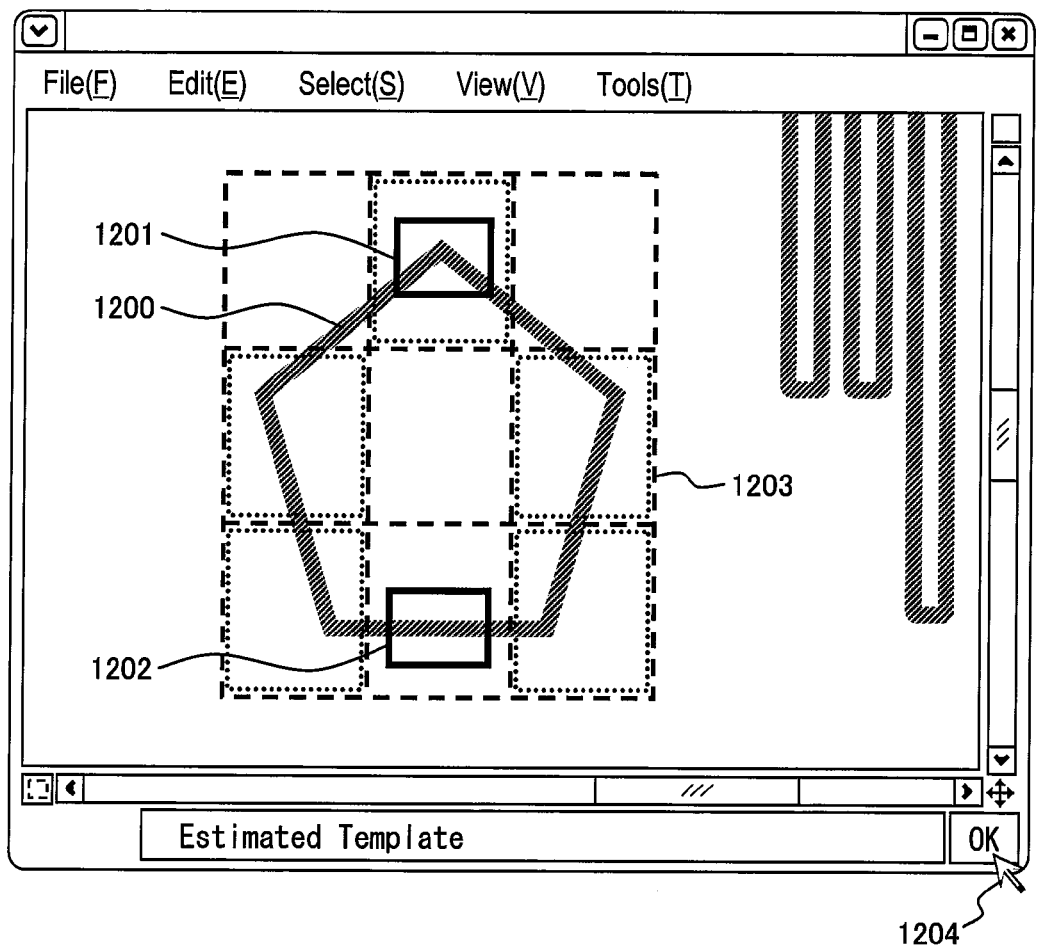
FIG. 12 is a screen showing one example of a display result of a measurement point and a positioning template.
Figure 12:
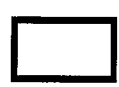
Figure 12:
Figure 12:

FIG. 12 shows two box-type measurement cursors (1201 and 1202) indicating measurement points designated by a user and a template frame 1203 on a microscope image.

In this example, a distance between portions indicated by the two box-type measurement cursors 1201 and 1202, which is the height of the vicinity of a center portion of a measuring object pattern 1200, is to be measured.

A rectangle having a proper size and position enclosing the polygon 1200 of the measuring object pattern is assigned and divided by 3×3 to calculate the parameter of a positioning template. Five characteristic portions are displayed as effective positions 1203 in FIG. 12.

When the displayed templates are appropriate, the user moves an arrow cursor to an acknowledge button "OK" in the lower right portion of the window and clicks the mouse, for example, to terminate the registration (see the reference numeral 1204).

Other Embodiments (Modified Embodiments)

In the method of registering a measurement point and a positioning template, a template automatically prepared in the first step may be prepared based on information registered before (by learning or the like) to improve accuracy.

The effective positions of template may be changed by designating any positions from the menu, not by designating preset positions from the menu.

In the similar structure pattern matching, the similar positional relationship may have likelihood to robustly deal with a shape change of a measuring object. A user may set the parameter of the likelihood.

CONCLUSION

According to the present embodiments, an image processing system (for example, a scanning electron microscope (CD-SEM)) for registering a measurement point and a positioning template in a pattern image on a wafer is provided. In the present system, a pattern image on a semiconductor wafer is displayed on a display screen of the system. When a measurement point is designated on a given point of the pattern image by a user, a positioning template (having a different size and position from those of the measurement point) is automatically generated based on the measurement point information and the pattern image. The template is displayed with the pattern image and the measurement point information, and they are registered in response to an instruction. In measurement (length measurement), even if there is no template which matches the pattern image of a measuring object in the positioning templates, if there is a template having a similar shape to the pattern image, the template is enlarged to derive measurement point information. It is therefore not necessary to prepare templates corresponding to respective pattern images having different sizes, and it is possible to rapidly and easily perform template registration. The template may be one large template, or a plurality of divided small templates.

According to the present system, the positioning template generated once may be corrected in response to an instruction input. For example, when the positioning template is constituted by a plurality of small templates obtained by dividing a square having a basic size by a predetermined division ratio and disposed on a pattern image, the division ratio of the generated positioning template may be changed in response to a resizing instruction from a user. The position of the positioning template may be also changed in response to an instruction from a user. The template may be thereby corrected by a simple operation even when the template displayed first is not appropriate, so as to register an optimum template.

According to the present embodiments, an image processing system (for example, a scanning electron microscope (CD-SEM)) for performing pattern matching of a pattern image on a wafer and the registered positioning template is provided. In the present system, a positioning template having a similar structure to a template which matches a pattern image of a measuring object is extracted from a plurality of positioning templates stored in memory means for storing the plurality of positioning templates and information of a plurality of measurement points respectively corresponding to the plurality of positioning templates. The enlargement ratio of the extracted positioning template having a similar structure with respect to the pattern image of a measuring object is calculated. Then, the corresponding measurement point information stored with the template is output by adjusting the position by the calculated enlargement ratio. The positioning template having a similar structure and the corrected (position adjustment) measurement point information are displayed with the pattern image of a measuring pattern on the screen. By performing pattern matching by the process as described above, it is not necessary to prepare templates having as many sizes as the number of pattern images, and it is possible to perform high-speed pattern matching and obtain a measurement point with high accuracy from the similar positional relationship.

The functions of the present embodiments may be also achieved by a program code of software. In this case, a memory medium storing the program code is provided to a system or an apparatus, and a computer (or CPU or MPU) of the system or the apparatus reads the program code stored in the memory medium. The program code itself read from the memory medium achieves the functions of the embodiments as described above, and the program code itself, or the memory medium storing the program code constitutes the present invention. The memory medium for providing the program code includes a floppy disk (registered trademark), CD-ROM, DVD-ROM, a hard disk, an optical disc, a magneto-optic disc, CD-R, a magnetic tape, a nonvolatile memory card, ROM or the like.

An operating system (OS) running on the computer may execute a part or entire actual processing based on an instruction of the program code to achieve the functions of the embodiments as described above by the processing. After the program code read from the memory medium is written to a memory on the computer, a CPU on the computer may execute a part or entire actual processing based on an instruction of the program code to achieve the functions of the embodiments as described above by the processing.

The functions of the embodiments as described above may be achieved such that the program code of software achieving the functions of the embodiments is delivered via a network and stored in memory means such as a hard disk or a memory of a system or an apparatus, or a memory medium such as CD-RW or CD-R, and a computer (or CPU or MPU) of the system or the apparatus reads and executes the program code stored in the memory means or memory medium.

What is claimed is:

1. An image processing system for registering a measurement point and a positioning template in a pattern image on a wafer, comprising:
    a display for obtaining the pattern image and displaying the pattern image on a screen;
    a processor for generating a plurality of templates, each of which contains a corner pattern which is different from each other corner pattern, based on the pattern image; and
    a memory device for registering the generated plurality of templates and the measurement point information, wherein
    the processor determines whether a disposition of matching positions by the plurality of templates has a predetermined positional relationship with an original disposition, and adjusts the registered measurement point based on the matching positions by the plurality of templates with respect to a pattern of the matching position which is determined as having the predetermined positional relationship to perform a measurement.

2. The image processing system according to claim 1, wherein the processor automatically calculates a template having a size and a position different from those of the measurement point itself.

3. The image processing system according to claim 1, wherein the display displays the generated plurality of templates with the pattern image on the screen.

4. The image processing system according to claim 3, wherein the memory device registers the generated plurality of templates in response to a registering instruction from a user.

5. The image processing system according to claim 1, wherein the processor generates the plurality of templates as a plurality of divided templates.

6. The image processing system according to claim 3, wherein the processor corrects the generated plurality of templates based on an instruction input.

7. An image processing system for registering a measurement point and a positioning template in a pattern image on a wafer, comprising:
    display means for obtaining the pattern image and displaying the pattern image on a screen;
    template generating means for obtaining measurement point information in the pattern image and generating a positioning template based on the measurement point information and the pattern image;
    information registering means for registering the generated positioning template and the measurement point information; and
    template correcting means for correcting the generated positioning template based on an instruction input, wherein
    the positioning template is used for obtaining measurement point information in a corresponding pattern image and a pattern image similar to the corresponding pattern image,
    the generated positioning template is constituted by a plurality of small templates obtained by dividing a square having a basic size by a predetermined division ratio and disposed on the pattern image, and
    the template correcting means changes the predetermined division ratio of the generated positioning template in response to a resizing instruction from a user.

8. The image processing system according to claim 6, wherein the processor changes a position of the generated plurality of templates in response to an instruction from a user.

9. A scanning electron microscope having a function of registering a measurement point and a positioning template in a pattern image on a wafer, comprising:
    a display for obtaining the pattern image and displaying the pattern image on a screen;
    a processor for generating a plurality of templates, each of which contains a corner pattern which is different from each other corner pattern, based on the pattern image; and
    a memory device for registering the generated plurality of templates and the measurement point information, wherein
    the processor determines whether a disposition of matching positions by the plurality of templates has a predetermined positional relationship with an original disposition, and adjusts the registered measurement point based on the matching positions by the plurality of templates with respect to a pattern of the matching position which is determined as having the predetermined positional relationship to perform a measurement.

10. A scanning electron microscope having a function of registering a measurement point and a positioning template in a pattern image on a wafer, comprising:
    display means for obtaining the pattern image and displaying the pattern image on a screen;
    template generating means for obtaining measurement point information in the pattern image and generating a positioning template based on the measurement point information and the pattern image; and information registering means for registering the generated positioning template and the measurement point information, wherein the positioning template is used for obtaining measurement point information in a corresponding pattern image and a pattern image similar to the corresponding pattern image, wherein the scanning electron microscope has a function of performing pattern matching of a pattern image on a wafer and a template, further comprising:

memory means for storing a plurality of positioning templates and information of a plurality of measurement points respectively corresponding to the plurality of positioning templates;

processing means for extracting a positioning template having a similar structure to a template that matches a pattern image of a measuring object from the plurality of positioning templates stored in the memory means; and output means for calculating an enlargement ratio of the extracted positioning template having a similar structure with respect to the pattern image of a measuring object and correcting by the enlargement ratio and outputting information of a corresponding measurement point.

* * * * *